(12) United States Patent
Gray et al.

(10) Patent No.: US 11,463,242 B2
(45) Date of Patent: Oct. 4, 2022

(54) PADDING ORACLE ELIMINATION IN RSA ENCRYPTION

(71) Applicant: International Business Machines Corporation, Armonk, NY (US)

(72) Inventors: Michael W. Gray, Guanaba (AU); Narayana Aditya Madineni, Southport (AU); Matthew Green, Ashmore (AU); Simon D. McMahon, GoldCoast (AU); Leigh S. McLean, Nerang (AU)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 16/877,701

(22) Filed: May 19, 2020

(65) Prior Publication Data
US 2021/0367771 A1    Nov. 25, 2021

(51) Int. Cl.
*H04L 9/08* (2006.01)
*H04L 9/06* (2006.01)
*H04L 9/32* (2006.01)
*H04L 9/30* (2006.01)

(52) U.S. Cl.
CPC .......... *H04L 9/0838* (2013.01); *H04L 9/0637* (2013.01); *H04L 9/0894* (2013.01); *H04L 9/302* (2013.01); *H04L 9/3236* (2013.01); *H04L 2209/20* (2013.01)

(58) Field of Classification Search
CPC ... H04L 9/0838; H04L 9/0637; H04L 9/0894; H04L 9/302; H04L 9/3236; H04L 2209/20
See application file for complete search history.

(56) References Cited

U.S. PATENT DOCUMENTS

| 7,649,991 B2 | 1/2010 | Nishioka et al. |
| 8,745,389 B2 | 6/2014 | Wray et al. |
| 10,277,611 B2 | 4/2019 | Steele |

(Continued)

FOREIGN PATENT DOCUMENTS

EP    3178190 B1 * 10/2018    ........... H04L 9/0662

OTHER PUBLICATIONS

Anonymous, "Method and system to avoid padding oracles while decrypting client key exchange message," IP.com Prior Art Database Technical Disclosure, IP.com No. IPCOM000260759D, Dec. 19, 2019, 5 pages.

(Continued)

*Primary Examiner* — Kristine L Kincaid
*Assistant Examiner* — Alexander R Lapian
(74) *Attorney, Agent, or Firm* — Jorge R. Maranto

(57) ABSTRACT

A method, a computer program product, and a system for removing padding oracles in encryption techniques. The method includes padding a plaintext message using a padding scheme producing a padded plaintext message. The method also includes encrypting the padded plaintext message using a block cipher generating an encrypted data block of fixed-size as well as a hash value. The method further includes randomly generating an ephemeral key and an initialization vector. The method also includes prepending the hash value, the ephemeral key, and the initialization vector to the encrypted data block. The method includes performing an encryption technique to the encrypted data block prepended with the hash value, the ephemeral key, and the initialization vector.

20 Claims, 8 Drawing Sheets

(56) References Cited

U.S. PATENT DOCUMENTS

| | | | | |
|---|---|---|---|---|
| 2001/0033656 A1* | 10/2001 | Gligor | .................. | H04L 9/0637 |
| | | | | 380/28 |
| 2018/0191506 A1* | 7/2018 | Vilvovsky | ............. | H04L 9/3247 |
| 2018/0337778 A1* | 11/2018 | Scheiblauer | .......... | H04L 9/3239 |
| 2020/0259647 A1* | 8/2020 | Goncalves | ............... | H04L 9/30 |

OTHER PUBLICATIONS

Kang et al., "New Efficient Padding Methods Secure Against Padding Oracle Attacks," ISISC 2015: Information Security and Cryptology, LNCS 9558, 2016, pp. 329-342, Springer International Publishing.

Paterson et al., "Immunising CBC Mode Against Padding Oracle Attacks: A Formal Security Treatment," SCN 2008: Security and Cryptography for Networks, LNCS 5229, 2008, pp. 340-357, Springer-Verlag Berlin Heidelberg.

Bock et al., "Return of Bleichenbacher's Oracle Threat (ROBOT)," Proceedings of the 27th USENIX Security Symposium, Aug. 2018, pp. 817-832, USENIX Association.

Bleichenbacher, D., "Chosen Ciphertext Attacks Against Protocols Based on the RSA Encryption Standard PKCS #1," CRYPTO 1998: Advances in Cryptology, LNCS 1462, 1998, pp. 1-12, Springer-Verlag Berlin Heidelberg.

Jonsson et al., "Public-Key Cryptography Standards (PKCS) #1: RSA Cryptography Specifications—Version 2.1," Network Working Group Request for Comments: 3447, Feb. 2003, Sections 7.1 and 7.2, 72 pages.

Romailler, Y., "Breaking RSA OAEP with Manger's Attack," Kudelski Security Research, Apr. 5, 2018, 6 pages. https://research.kudelskisecurity.com/2018/04/05/breaking-rsa-oaep-with-mangers-attack/.

Dierks, T., "The Transport Layer Security (TLS) Protocol—Version 1.1," Network Working Group Request for Comments: 4346, Apr. 2006, Section 7.4.7.1, 87 pages.

Mell et al., "The NIST Definition of Cloud Computing", Recommendations of the National Institute of Standards and Technology, Special Publication 800-145, Sep. 2011, 7 pages.

\* cited by examiner

PADDING ORACLE ELIMINATION IN RSA ENCRYPTION

BACKGROUND

The present disclosure relates to asymmetric key encryption, and more specifically, to eliminating padding oracles in Rivest, Shamir, Adleman (RSA) encryption.

RSA encryption is a form of asymmetric key encryption that uses a public key and a private key to encrypt and decrypt messages, respectively. RSA works by creating a mathematical object called a trapdoor permutation that transforms a first number into a second number, such that computing the second number from the first number using a public key is possible. However, computing the first number from the second number is not possible without knowing the private key.

RSA encryption includes additional data added to the message data being encrypted to improve security. This is known as padding. A padding oracle is a type of oracle that takes encrypted data from a user, attempts to decrypt it, and reveals whether or not the padding added to the message data is correct. An attacker can detect padding oracles and use that information to decrypt the ciphertext produced by the RSA encryption.

SUMMARY

Embodiments of the present disclosure include a computer-implemented method for removing padding oracles from RSA encryption techniques. The computer-implemented method includes padding a plaintext message producing a padded plaintext message. Padding can be performed using known padding schemes. The computer-implemented method also includes encrypting the padded plaintext message using a block cipher to generate an encrypted data block of fixed-size and a hash value, randomly generating an ephemeral key and an initialization vector. The sizes of the ephemeral key and the initialization vector are multiples of the size of the encrypted data block. The computer-implemented method also includes prepending the hash value, the ephemeral key, and the initialization vector to the encrypted data block and performing RSA encryption on the prepended and encrypted data block.

Further embodiments of the present disclosure include a computer program product for removing padding oracles from RSA encryption techniques, which can include a computer-readable storage medium having program instructions embodied therewith, the program instructions executable by a processor to cause the processor to perform a method. The method includes padding a plaintext message producing a padded plaintext message. Padding can be performed using known padding schemes. The method also includes encrypting the padded plaintext message using a block cipher to generate an encrypted data block of fixed-size and a hash value, randomly generating an ephemeral key and an initialization vector. The sizes of the ephemeral key and the initialization vector are multiples of the size of the encrypted data block. The method also includes prepending the hash value, the ephemeral key, and the initialization vector to the encrypted data block and performing RSA encryption on the prepended and encrypted data block.

Additional embodiments are directed to a padding oracle elimination system for providing request messages with zero round trip time in a TLS session and configured to perform the method described above. The present summary is not intended to illustrate each aspect of, every implementation of, and/or every embodiment of the present disclosure

BRIEF DESCRIPTION OF THE DRAWINGS

These and other features, aspects, and advantages of the embodiments of the disclosure will become better understood with regard to the following description, appended claims, and accompanying drawings where:

Figure 1:
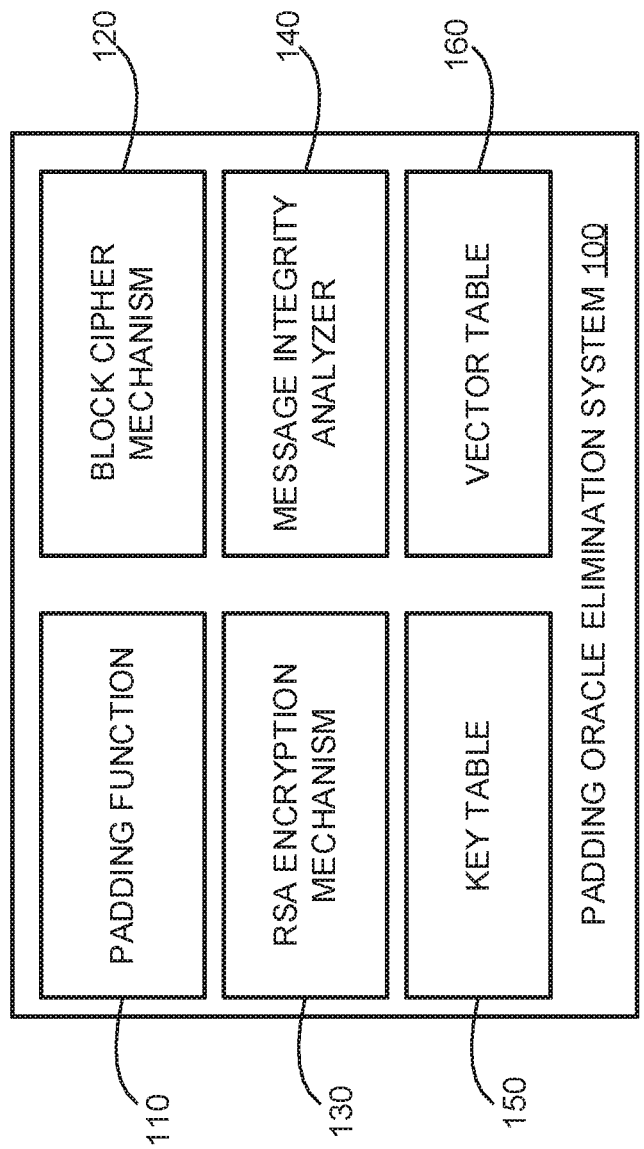
FIG. 1 is a block diagram illustrating a padding oracle elimination system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to asymmetric key encryption, and more specifically, to eliminating padding oracles in RSA encryption. While the present disclosure is not necessarily limited to such applications, various aspects of the disclosure may be appreciated through a discussion of various examples using this context.

Encryption applies cryptographic techniques making data incomprehensible to provide confidential communication. Typically, encryption methods use algorithms called ciphers, and secret values called keys. The secret keys are used to decrypt messages encrypted by the ciphers. Encryption methods can be either symmetric or asymmetric. In symmetric encryption, the key used to decrypt a message is the same key used to encrypt the message. In asymmetric encryption, the key used to decrypt a message is different from the key used to encrypt the message.

In terms of security, a cipher can be measured in terms of computational security. Computational security is a method of quantifying the security of a cipher or crypto algorithm. A cipher or algorithm can be viewed as secure if the encryption cannot be broken within a reasonable amount of time. For example, a cipher that requires testing a million keys every second for a billion years can be considered computationally secure as it would take an unreasonable amount of time to break.

A plaintext message, as referred herein, is an unencrypted message that can be encrypted with a cipher to render the message confidential. Once encrypted, the plaintext message can be referred to as ciphertext.

Introduced in 1977, RSA encryption is an algorithm used by modern computers to encrypt and decrypt messages asymmetrically. It is a cryptosystem where the encryption key is public and distinct from the decryption key, which is kept private. Using textbook RSA encryption, an attacker can create a valid ciphertext from two RSA ciphertexts. By doing so, the security of the encryption is compromised because an attacker can deduce information about an original message. Thus, textbook RSA encryption is known to be malleable.

In order to make RSA encryption nonmalleable, the plaintext message can be added with additional data called padding. Commonly, RSA encryption utilizes Optimal Asymmetric Encryption Padding (OAEP), also known as RSA-OAEP. Extra random data, or padding, is added to the plaintext message prior to applying the RSA cipher. A pseudorandom number generator (PRNG) can be used to ensure the ciphertext is indistinguishable and nonmalleable by making the encryption probabilistic.

Limitations on RSA security remains, however, as current RSA encryption techniques lead to padding oracles, which leave plaintext messages susceptible to attacks. Padding schemes used by RSA can also expose timing and logic oracles, which can also be used to recover information about the plaintext message. The padding schemes are vulnerable due to the padding being removed at the RSA layer along with the allowed variable input size of the RSA plaintext.

A Bleichenbacher attack is a type of attack based on a padding oracle revealing whether or not a decrypted message is correctly padded. The attack finds the whole plaintext message, even when it is unpadded or padded. For example, an attacker, using this type of attack, can prepare ciphertexts that are sent to a server that can return whether or not padding to the ciphertexts are valid or invalid. The attacker can combine the returns from the server to gradually gain information on a plaintext message. This type of attack does not need access to private keys as it can be carried out if an attacker has access to a server that accepts encrypted messages and returns an error message on whether the decrypted message conforms to a standard.

To mitigate Bleichenbacher attacks, the Transport Layer Security (TLS) standard implemented countermeasures that do not allow an attacker to distinguish between valid and invalid ciphertext messages. Once a server receives a ciphertext message, it proceeds with attempting to decipher the message and responds to the attacker with the same alert message regardless if the ciphertext is valid or invalid. Thus, an attacker cannot determine the validity of the ciphertext they are sending.

Another type of attack, known as return of Bleichenbacher's oracle threat (ROBOT), also utilizes padding oracles to decipher plaintext messages. A ROBOT attack circumvents measures implemented by providers that prevent a Bleichenbacher attack by slightly modifying ciphertext messages in order to receive the required validity messages from a server. As a result, the RSA encryption key exchange is deprecated in TLS 1.3 and later. However, RSA encryption can still be considered secure encryption if padding oracles can be removed.

Embodiments of the present disclosure may overcome the above and other problems by using a padding oracle elimination system. The padding oracle elimination system includes a padding function configured to apply padding schemes to plaintext messages and a block cipher mechanism configured to encrypt padded plaintext messages with ephemeral keys and initialization vectors. The block cipher mechanism produces encrypted data blocks of fixed sizes. Hash values can also be calculated for the encrypted data blocks produced. The hash values are numeric values of a fixed length that uniquely identify data. They can be used to verify the integrity of the encrypted data blocks. The hash value of received data can be compared to the hash value of data as it was sent to determine whether the data was altered. The padding oracle elimination system further includes an RSA encryption mechanism configured to perform RSA encryption on encrypted data blocks.

More specifically, the padding oracle elimination system described herein removes padding oracles from RSA encryption by applying a hash function to any padding scheme used in the encryption process and by preventing variable-length input into the RSA encryption function. Embodiments of the present disclosure perform RSA encryption that prohibits variable-length input into the RSA encryption function, whereby removing the padding process at the RSA encryption layer. Instead, variable-length plaintext messages are buried in padding under a hash by applying an encrypt-then-authenticate operation before the RSA encryption takes place. Typically, encrypt-then-authenticate operations yield fixed-size inputs ensuring that no padding oracles can exist to reveal information when an attacker attempts to induce RSA faults using ciphertext attacks.

By way of example, but not by limitation, an encrypting party applies a padding scheme, such as OAEP, to a plaintext message. A random ephemeral key and initialization vector are generated to perform an encrypt-then-authenticate operation with a block cipher on the padded plaintext message. The result of the block cipher is a fixed-size data block and a hash relating to the integrity of the data block. The encrypting party then prepends the hash, the ephemeral key, and the initialization vector to the data block. Textbook RSA encryption can then be applied to the prepended data block and transmitted to a receiving party. The receiving party can decrypt the encrypted prepended data block using an RSA private key, and then decrypt the data block using the prepended key and initialization vector.

During the decryption process, cipher messages using this technique are not scanned for padding as the messages are of a fixed-size record. Integrity verification is done using the hash, preventing any padding oracle from being created. If a fault is detected during the integrity verification, only random data is revealed. During the RSA decryption process, however, nothing from the integrity verification is revealed that indicates a length of the plaintext message. Once decrypted, the data block can be decrypted using the block cipher decryption, and padding can be removed to reveal the plaintext message. No padding oracle can exist in the RSA layer as the padding is removed subsequent to the RSA decryption procedure.

In some embodiments, the selection of hash algorithms, encryption algorithms, and key sizes are predetermined. By limiting the configuration between a sender and receiver, attacks on configuration alterations are removed. For example, ROBOT attacks exploit message configurations that provide side-channels for constructing padding oracles similar to that of a Bleichenbacher attack. By limiting configurations, these side-channel vulnerabilities can be reduced or eliminated altogether.

In some embodiments, the receiving party (i.e., a server) determines whether a prepended ephemeral key is a duplicate of a previously used key. The receiving party can maintain an ephemeral key table that stores previously used ephemeral keys. The ephemeral key received by the receiving party can be compared against entries in the key table to determine if the key has been used. Upon determining that there is no matching entry for the ephemeral key, the receiving party can authorize the use of the key. The receiving party can also store an entry for that ephemeral key in the key table. However, if the ephemeral key matches an entry in the key table, the receiving party may deny the message as that can be an indication of an attacker attempting to initiate a padding oracle.

In some embodiments, the receiving party determines whether a prepended initialization vector is a duplicate of a previously used initialization vector. The receiving party can maintain an initialization vector table that stores previously used initialization vectors. The initialization vector received by the receiving party can be compared against entries in the vector table to determine if the initialization vector has been used. Upon determining that there is no matching entry for the initialization vector, the receiving party can authorize the use of the initialization vector. Additionally, the receiving party can store an entry for that initialization vector in the vector table. However, if the initialization vector matches an entry in the vector table, the receiving party may deny the message as that can also be an indication of an attacker attempting to initiate a padding oracle.

In some embodiments, the block cipher used to encrypt the padded plaintext message uses cipher block chaining is a mode of operation. A mode of operation describes how to repeatedly apply a cipher's single-block operation to transform data larger than a block. In cipher block chaining, each block of plaintext message is XORed with the previous ciphertext block before being encrypted.

In some embodiments, the padding performed on the plaintext message uses OAEP as the padding scheme. OAEP uses a Feistel network with a pair of random oracles to process the plaintext message.

Referring now to FIG. 1, shown is a block diagram illustrating a padding oracle elimination system 100, in accordance with embodiments of the present disclosure. The padding oracle elimination system 100 includes a padding function 110, a block cipher mechanism 120, an RSA encryption mechanism 130, a message integrity analyzer 140, an ephemeral key table 150, and an initialization vector table 160.

The padding function 110 is a component of the padding oracle elimination system 100 configured to apply a padding scheme to plaintext messages, in accordance with embodiments of the present disclosure. Padding schemes are mechanisms for appending random data onto plaintext messages. Padding is used in conjunction with ciphers that operate on blocks of data. These ciphers include, but are not limited to, block ciphers, Message Authentication Code (MAC) algorithms, and hash functions. If a plaintext message is not a multiple of a block size, padding can add some number of bytes to the plaintext message to increase the size to allow for the cipher to work appropriately.

The padding function 110 is agnostic, in that, it can apply various types of padding schemes to plaintext messages. These padding schemes include, but are not limited to, bit padding, trailing bit complement (TBC) padding, Public Key Cryptography Standards (PKCS) #1 padding, PKCS #7 padding, International Organization of Standardization (ISO) 7816 padding, and zero-byte padding. Using these padding schemes, the padding function 110 can adjust the plaintext message to an appropriate size needed for encryption.

In some embodiments, the padding function 110 applies OAEP padding. In some embodiments, OAEP applies padding as defined by equations 1 and 2, described below:

$$m'=m\|0^\wedge(g-len(m)) \quad \text{Equation 1}$$

$$X=m'\oplus G(r)\|11r\oplus H(m'\oplus G(r)) \quad \text{Equation 2}$$

OAEP uses two hash functions G and H. Hash function G outputs g bits and hash function H outputs h bits. Additionally, r refers to a random nonce of g bits. Equation 1 appends zeros to message m such that the length of m' is g bits long. Equation 2 calculates X by concatenating two parts. The first part is the message m' XORed with the output of the hash of r. The second part is r XORed with the hash of the first part. The result X can then be encrypted and sent as an encrypted message of the original plaintext message m.

The block cipher mechanism 120 is a component of the padding oracle elimination system 100 configured to apply block cipher encryption to padded plaintext messages, in accordance with embodiments of the present disclosure. A block cipher consists of an encryption algorithm and a decryption algorithm. The encryption algorithm takes a key, and a plaintext block, and produces a ciphertext block. Inversely, the decryption algorithm decrypts a message to the original plaintext. Block ciphers can operate with various block sizes and key sizes. Typically, block ciphers have either 64-bit or 128-bit blocks. These blocks are processed by the cipher blocks and return a ciphertext. The encryption process is conducted over a series of sequences, commonly referred to as rounds. A round is a basic transformation of a block, which is iterated several times to form the block cipher's algorithm. The block cipher mechanism 120 can utilize a variety of encryption functions when encrypting a padded plaintext message. These encryption functions include, but are not limited to, Lucifer/Data Encryption Standard (DES), International Data Encryption Algorithm (IDEA), RC5, Rijndael/Advanced Encryption Standard (AES), and blowfish.

In some embodiments, the block cipher mechanism 120 applies a block cipher in cipher block chaining (CBC) mode. In CBC mode, each block of plaintext is XORed with the previous ciphertext before being encrypted. By doing so, each ciphertext block depends on all plaintext blocks processed up to that point. A padded plaintext message is divided into blocks of a predetermined size. Each message block is encrypted using an encryption function (e.g., AES, DES) using the same key for each message block. After the first message block is encrypted, the outputted ciphertext is XORed with the second message block prior to encrypting the second message block. This process continues until all message blocks are encrypted. An initialization vector is added to the first message block prior to encryption to ensure each encrypted message block is unique.

The RSA encryption mechanism 130 is a component of the padding oracle elimination system 100 configured to apply RSA encryption to encrypted data blocks, in accordance with embodiments of the present disclosure. RSA encryption is an asymmetric encryption technique where a sending party encrypts a message using a public key provided by a receiving party. The receiving party can then decrypt the message using a private key. The RSA encryption mechanism 130 is further configured to decrypt received messages encrypted using a corresponding public key.

The RSA encryption mechanism 130 can apply textbook RSA encryption to encrypted data blocks produced by the block cipher mechanism 120. Textbook RSA encryption refers to an RSA encryption scheme wherein a message contains only the message you want to encrypt. That is, textbook RSA encryption does not include padding on the message that it is directly encrypting.

The message integrity analyzer 140 is a component of the padding oracle elimination system 100 configured to perform integrity verifications on received messages using hash functions, in accordance with embodiments of the present disclosure. The hash functions include, but are not limited to, MD5, SHA-1, SHA-256, SHA-3, and BLAKE2. After the RSA encryption mechanism 130 decrypts a received message, the message integrity analyzer 140 can perform an integrity verification using the hash value prepended onto the received data block. The hash value of received data can be compared to the hash value of data as it was sent to determine whether the data was altered.

The message integrity analyzer 140 can verify a hash value received prepended to a message by comparing that value with a generated hash value of the message. A hash value can be generated using a hash function (e.g., SHA-256) on a data block. The hash value is unique to that data block and can be used to authenticate the data block. For example, a data block with a prepended hash value is received by a receiving party. The receiving party can recalculate the hash value using the same hash function as the sending party and can compare it to the prepended hash value received. If the hash values differ then the data block has been altered. Otherwise, the data has not been altered and the integrity of the data has been verified.

The ephemeral key table 150 is a component of the padding oracle elimination system 100 configured to store received keys relating to the padding oracle elimination system 100, in accordance with embodiments of the present disclosure. While shown in FIG. 1 as a table, the ephemeral key table 150 can be a mapping, a database, journal, metadata, and the like. The ephemeral key table 150 can store ephemeral keys received in encrypted data block messages.

The initialization vector table 160 is a component of the padding oracle elimination system 100 configured to store received initialization vectors relating to the padding oracle elimination system 100, in accordance with embodiments of the present disclosure. While shown in FIG. 1 as a table, the initialization vector table 160 can be a mapping, a database, journal, metadata, and the like. The initialization vector table 160 can store initialization vectors received in encrypted data block messages.

It is noted that FIG. 1 is intended to depict the major representative components of an exemplary padding oracle elimination system 100. In some embodiments, however, individual components may have greater or less complexity than as represented in FIG. 1, components other than or in addition to those shown in FIG. 1 may be present, and the number, type, and configuration of such components may vary.

Figure 2:
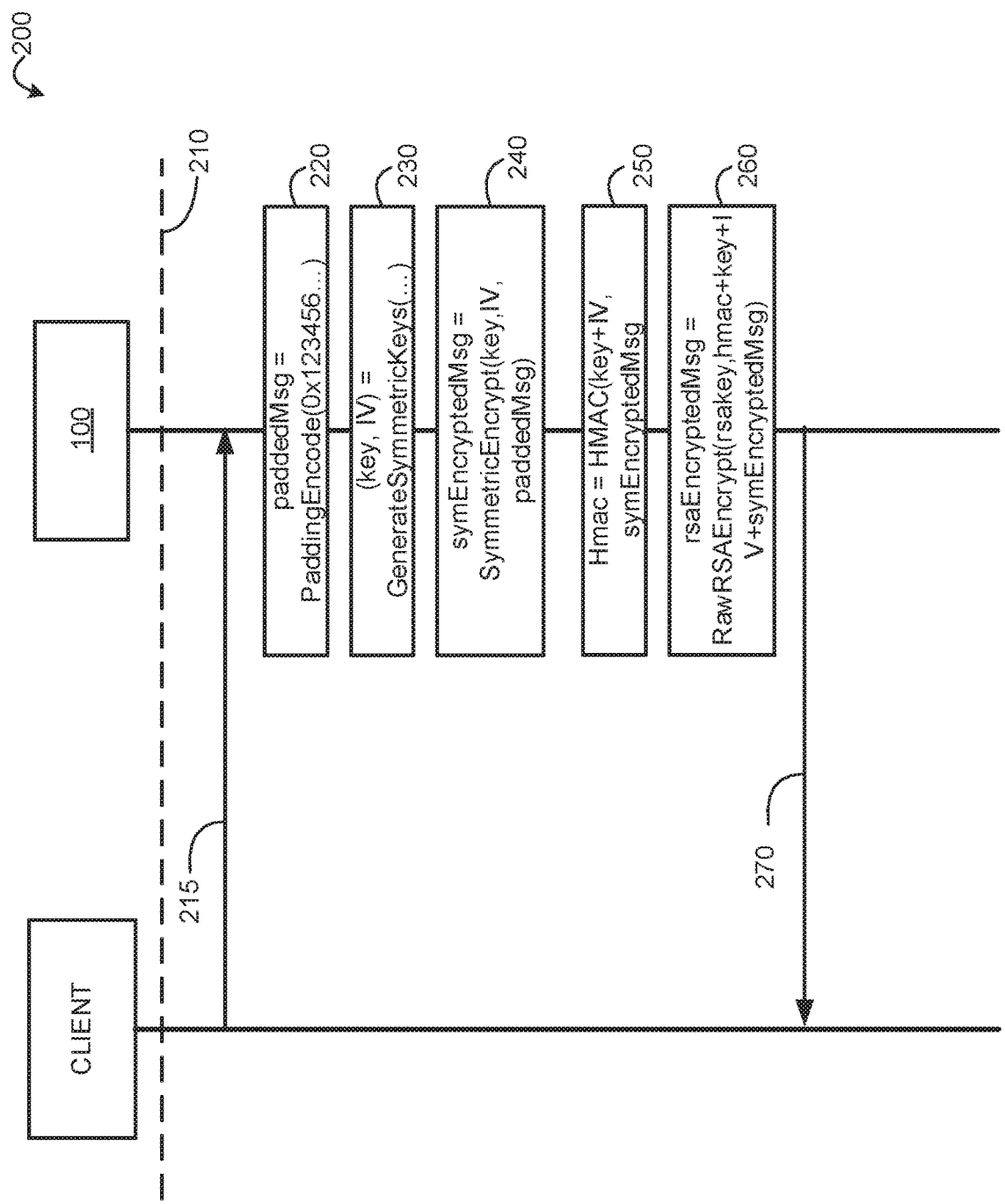
FIG. 2 is a data flow diagram illustrating an encryption process, in accordance with embodiments of the present disclosure.

FIG. 2 is a data flow diagram 200 illustrating an encryption procedure according to the padding oracle elimination system 100, in accordance with embodiments of the present disclosure. To illustrate data flow diagram 200, but not to limit embodiments, FIG. 2 is described within the context of the padding oracle elimination system 100 of FIG. 1.

At step 215, a client initiates an encryption procedure 210 for a plaintext message. The encryption procedure is the encryption process performed by the padding oracle elimination system 100. Once initiated, the padding oracle elimination system 100 pads the plaintext message to 160 bytes using a padding scheme at step 220.

At step 230, the padding oracle elimination system 100 generates a random AES-256 key that is 32 bytes in length and an initialization vector that is 16 bytes in length. At step 240, block cipher in CBC mode encrypts the padded plaintext message using the key and the initialization vector. The result produces an encrypted data block that is 160 bytes in length.

At step 250, the padding oracle elimination system 100 applies a hash-based message authentication code (HMAC) function, such as SHA-256, on the encrypted data block using the key and the initialization vector. The hash function produces a hash value for the encrypted data block providing integrity information for the encrypted data block.

At step 260, the hash value, the key, and initialization vector are prepended to the encrypted data block increasing the size of the data block to 240 bytes. Using textbook RSA encryption, the padding oracle elimination system 100 encrypts the prepended data block to create an RSA ciphertext. The RSA ciphertext is provided to the client at step 270 which can be transmitted to a receiving party, or server.

Figure 3:
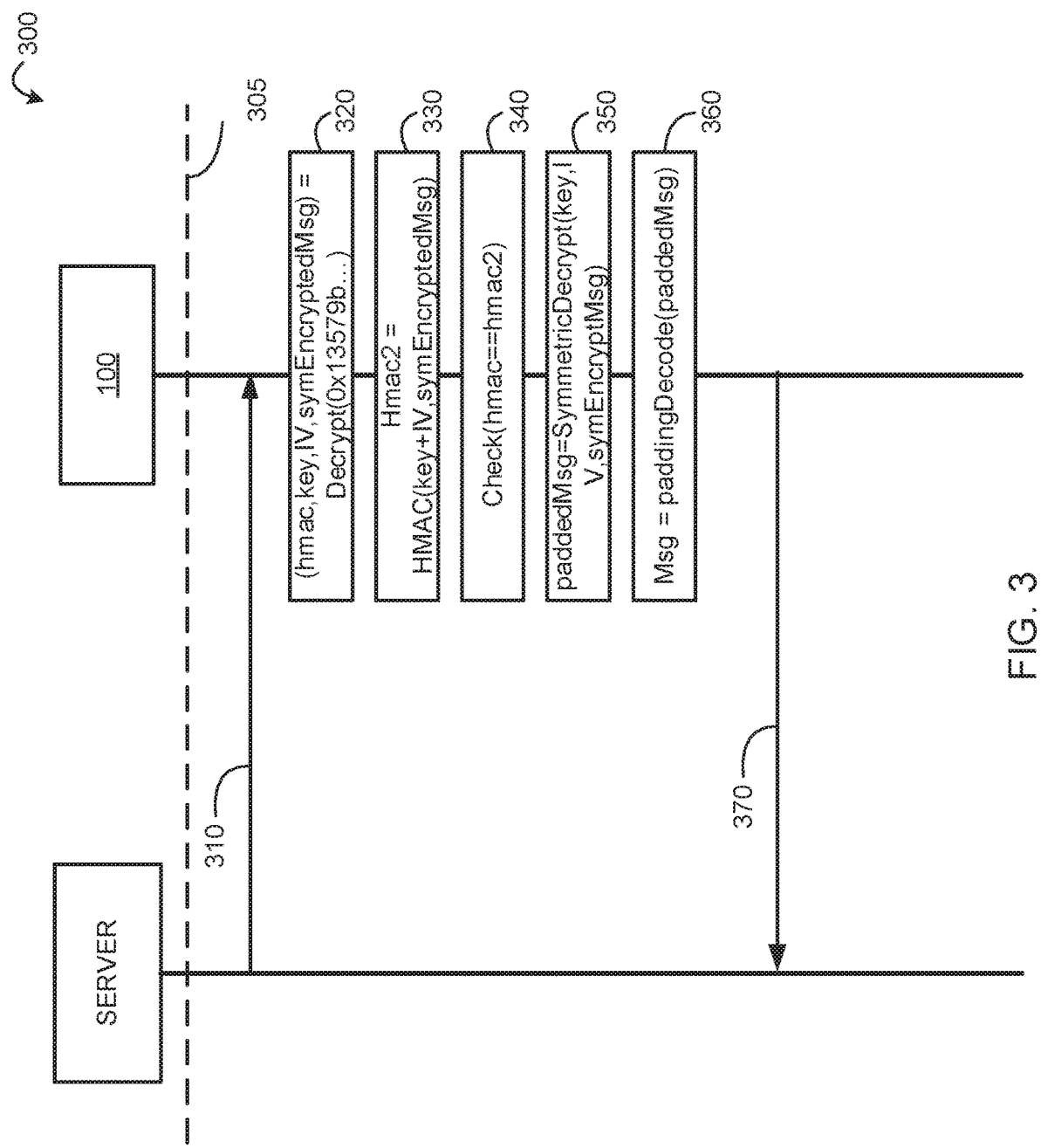
FIG. 3 is a data flow diagram illustrating a decryption process, in accordance with embodiments of the present disclosure.

FIG. 3 is a data flow diagram 300 illustrating a decryption procedure according to the padding oracle elimination system 100, in accordance with embodiments of the present disclosure. To illustrate data flow diagram 300, but not to limit embodiments, FIG. 3 is described within the context of the padding oracle elimination system 100 of FIG. 1.

At step 310, a server initiates a decryption procedure 305 of a ciphertext. The decryption procedure is the decryption process performed by the padding oracle elimination system 100. Once initiated, the padding oracle elimination system 100 decrypts the ciphertext using textbook RSA decryption. This is shown at step 320. The decryption produces an encrypted data block of a plaintext message. The data block being of a fixed-size of 240 bytes. Additionally, the RSA decryption process does not perform a padding check on the ciphertext.

At step 330, the padding oracle elimination system 100 separates a hash value, a key, and an initialization vector prepended onto the encrypted data block. An integrity verification is performed on the encrypted data block by recalculating the hash value for the encrypted data block, the key, and the initialization vector.

At step 340, the calculated hash value is compared against the received hash value to verify the integrity of the data block. Upon determining that the value is different, the data block can be rejected. Otherwise, if the values are the same, then the padding oracle elimination system 100 proceeds to step 350.

At step 350, the encrypted data block is decrypted using the key and the initialization vector. The result of the decryption reveals a padded plaintext message. At step 360, the padding is removed from the padded plaintext message to reveal the plaintext message. At step 370, the plaintext message is transmitted to the server.

Figure 4:
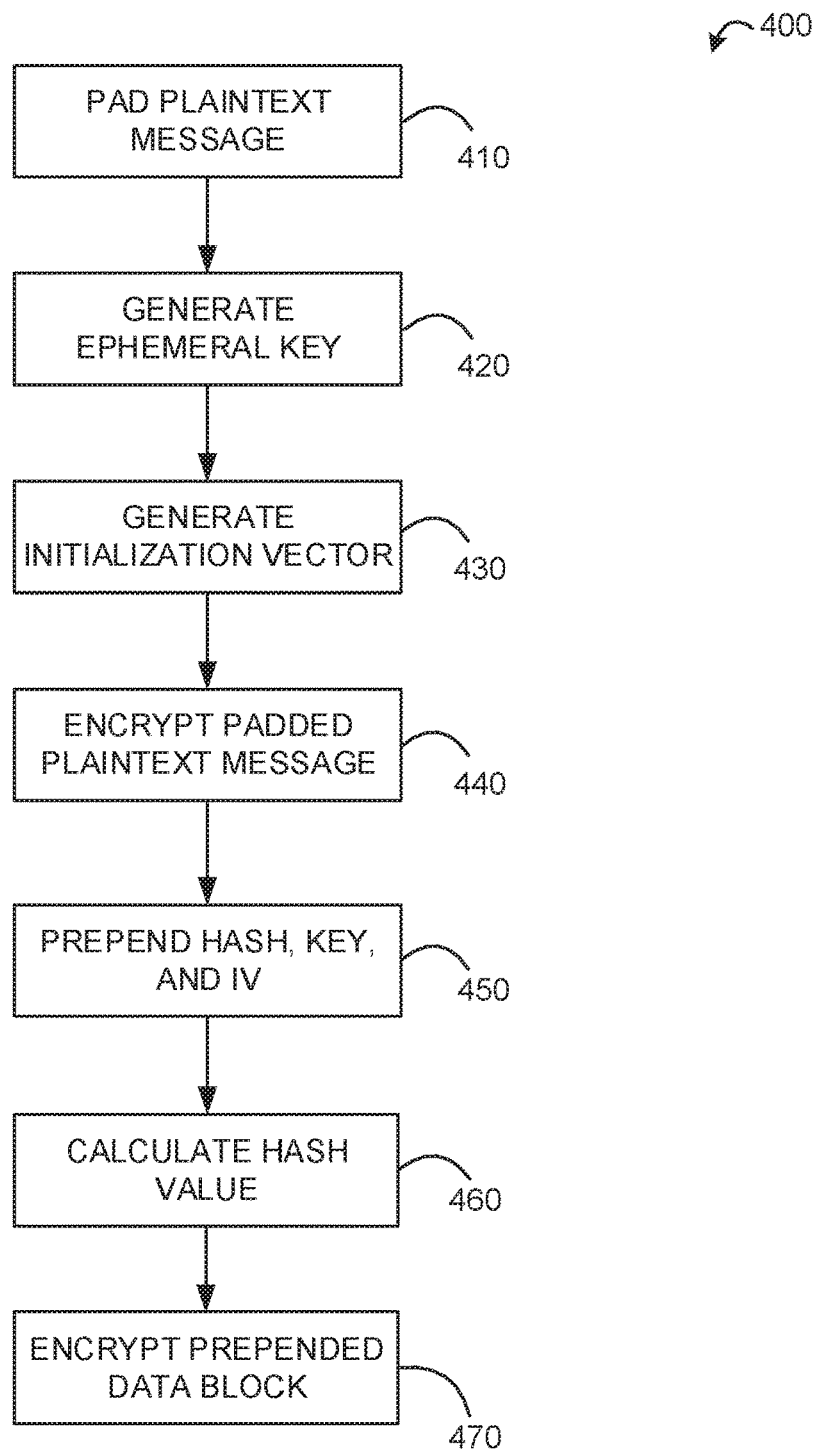
FIG. 4 is a flow diagram of encryption process, in accordance with embodiments of the present disclosure.

FIG. 4 is a flow diagram illustrating a process 400 for encrypting a plaintext message, in accordance with embodiments of the present disclosure. The process 400 may be performed by hardware, firmware, software executing on at least one processor, or any combination thereof. For example, any or all of the steps of the process 400 may be performed by one or more computing devices (e.g., computer system 600 of FIG. 6). To illustrate process 400, but not to limit embodiments, FIG. 4 is described within the context of the padding oracle elimination system 100 of FIG. 1.

The process 400 begins with the padding function 110 applying a padding scheme to a plaintext message. This is illustrated at step 410. The plaintext message can be a message a client/sending party wishes to transmit to a server/receiving party. The padding function 110 can apply a variety of different padding schemes onto the plaintext message. For example, the padding function 110 can apply OAEP to the plaintext message or the padding function can append random data to the plaintext message such that size of the plaintext message is adjusted to a predetermined size. To prepare the plaintext message for symmetric-key encryption, the length of the plaintext message must be a multiple of a predetermined block-size (e.g., 128 bytes, 256 bytes). The plaintext message may require padding to bring the length of the message in line with the block size.

In some embodiments, the padding function 110 applies bit padding to the plaintext message. A single '1' bit is added to the plaintext message and accompanied with as many '0' bits as necessary to achieve the required block-size for block cipher encryption.

The block cipher mechanism 120 generates an ephemeral key that is to be used for encrypting the padded plaintext message. This is illustrated at step 420. A different ephemeral key is generated each time the encryption process 400 is performed by the padding oracle elimination system 100. In some embodiments, an ephemeral key is generated for the duration of a session between a client and a server. In such instances, an ephemeral Diffie-Hellman (DH) key agreement can be used. It should be noted, however, that other schemes can be used to generate the ephemeral key.

The block cipher mechanism 120 generates an initialization vector that is to be used for encrypting the padded plaintext message. This is illustrated at step 430. The initialization vector can be a random cryptographic primitive used to prevent an attacker from inferring relationships between segments of an encrypted message. In some embodiments, the block cipher mechanism 120 generates a unique initialization vector to be used for the duration of a session between a client and a server.

The block cipher mechanism 120 encrypts the padded plaintext message with a block cipher using the ephemeral key and the initialization vector. This is illustrated at step 440. The block cipher mechanism 120 can utilize a variety of block cipher encryption functions when encrypting the padded plaintext message. For example, the block cipher can encrypt the padded plaintext message using the AES encryption algorithm. The result of the block cipher encryption is an encrypted data block of a fixed-size. For example, the plaintext message can be padded to a block-size dictated by the block cipher (e.g., 160 bytes) such that the encrypted data block is also the same size.

In some embodiments, the block cipher mechanism 120 encrypts the padded plaintext message using a block cipher in CBC mode. In CBC mode, each block of the plaintext message is XORed with the previous ciphertext block before being encrypted. Prior to the first block being encrypted, the initialization vector is XORed to the first block to ensure that the encrypted first block is unique.

The ephemeral key and the initialization vector are prepended onto the encrypted data block. This is illustrated at step 450. The ephemeral key and the initialization vector can be prepended in any order or in a fixed order depending on predetermined transmission requirements. For example, a requirement may mandate that the ephemeral key be prepended after the initialization vector. Alternatively, a requirement may mandate that the initialization vector be prepended after the ephemeral key.

The message integrity analyzer 140 calculates a hash value for the prepended encrypted data block. This is illustrated at step 460. In some embodiments, an HMAC is used to calculate the hash value. HMAC uses two passes of hash computation. The secret key is first used to derive two keys. The first pass of the hash algorithm produces an internal hash value derived from the prepended encrypted data block. The second pass produces the final hash value derived from the internal hash value and the ephemeral key.

The hash value is prepended to the encrypted data block. This is illustrated at step 470. Once prepended, the RSA encryption mechanism 130 encrypts the encrypted data block using textbook RSA encryption. The result of the encryption is a ciphertext that can be transmitted to a client/receiving party.

Figure 5:
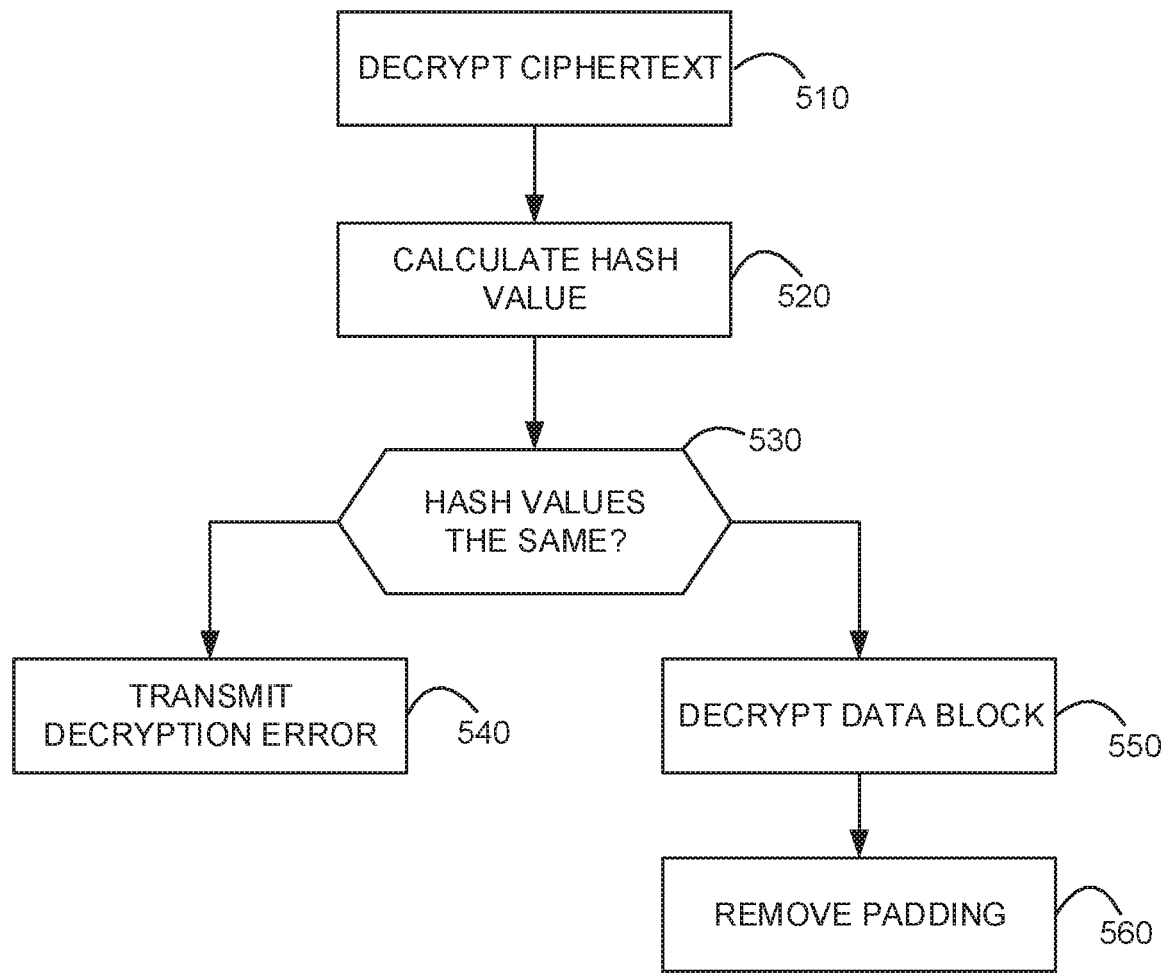
FIG. 5 is a flow diagram of decryption process, in accordance with embodiments of the present disclosure.

FIG. 5 is a flow diagram illustrating a process 500 of decrypting a ciphertext, in accordance with embodiments of the present disclosure. The process 500 may be performed by hardware, firmware, software executing on at least one processor, or any combination thereof. For example, any or all of the steps of the process 500 may be performed by one or more computing devices (e.g., computer system 600 of FIG. 6). To illustrate process 500, but not to limit embodiments, FIG. 5 is described within the context of the padding oracle elimination system 100 of FIG. 1.

The RSA encryption mechanism 130 decrypts a received ciphertext. This is illustrated at step 510. The result of the decryption is an encrypted data block with a hash value, an ephemeral key, and initialization vector prepended onto the encrypted data block.

The message integrity analyzer 140 calculates a hash value for the prepended encrypted data block. This is illustrated at step 520. In some embodiments, an HMAC is used to calculate the hash value. HMAC uses two passes of hash computation. The secret key is first used to derive two keys. The first pass of the hash algorithm produces an internal hash value derived from the prepended encrypted data block. The second pass produces the final hash value derived from the internal hash value and the ephemeral key.

The message integrity analyzer 140 perform an integrity verification by comparing the calculated hash value to the prepended hash value. This is illustrated at step 530. If the hash values are not the same value, the received ciphertext is rejected and a decryption error can be transmitted to the sending party. This is illustrated at step 540. If an attacker has altered the ciphertext, the hash value comparison can detect the alteration and reject the message. A padding oracle is not created as the error is detected prior to removing the padding from the plaintext message. Additionally, a timing oracle is not created since the time required to calculate a hash value and perform an integrity verification is consistent.

Upon determining the hash values are the same, the process 500 proceeds to decrypt the encrypted data block using the prepended ephemeral key and the initialization vector. This is illustrated at step 550. The result produces a padded plaintext message. The padding can be removed from the plaintext message using the same padding scheme used to pad the plaintext message to reveal the plaintext message. This is illustrated at step 560. The plaintext message can then be transmitted to the server/receiving party for evaluation.

Figure 6:
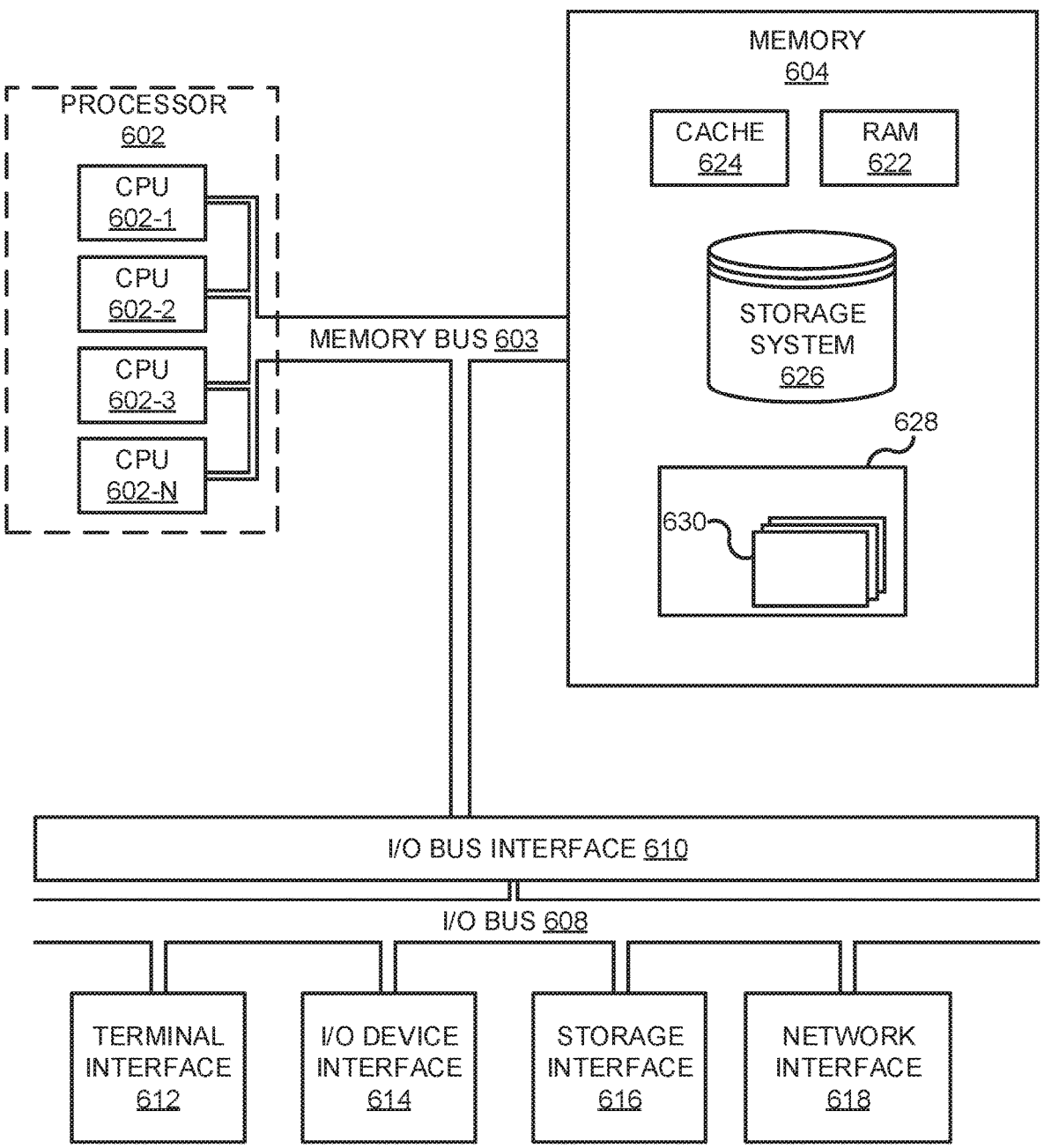
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 600 (e.g., the padding oracle elimination system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, a I/O (Input/Output) device interface 614, a storage interface 616, and a network interface 618, all of which may be communicatively coupled, directly or indirectly, for inter-component communication via a memory bus 603, a I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 601 may execute instructions stored in the memory 604 and may include one or more levels of on-board cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
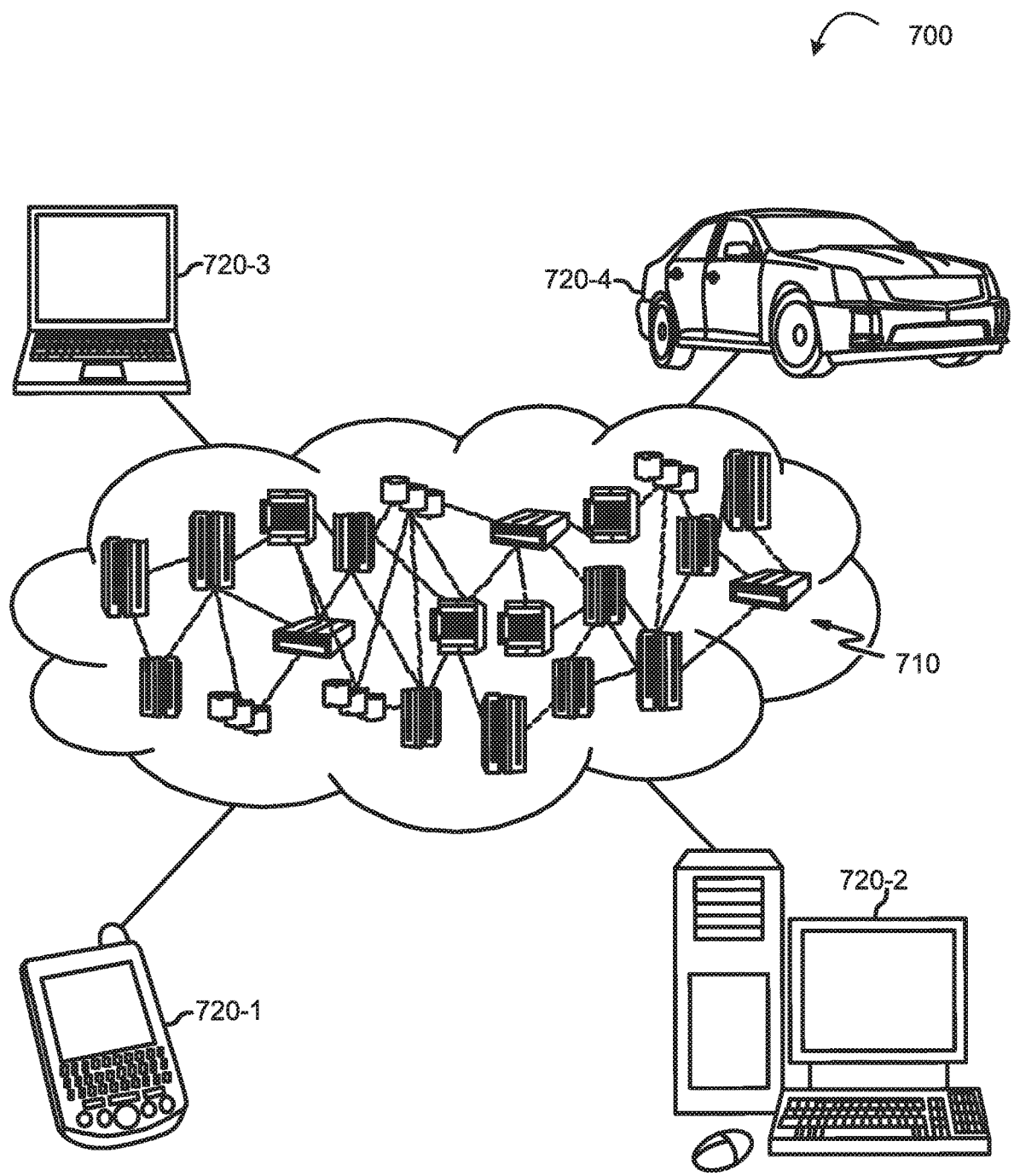
FIG. 7 depicts a cloud computing environment, in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
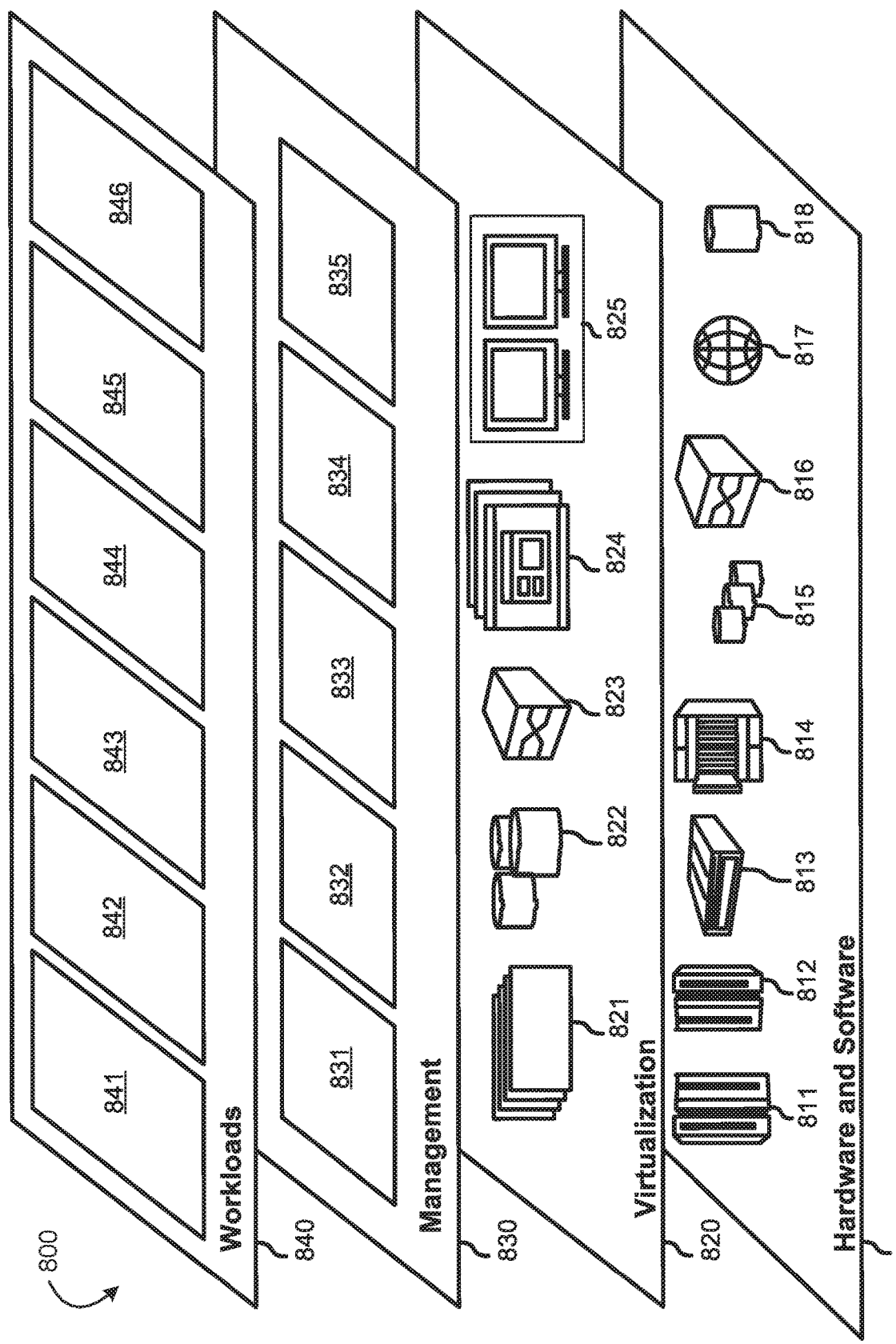
FIG. 8 depicts abstraction model layers, in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include mapping and navigation 841; software development and lifecycle management 842 (e.g., the padding oracle elimination system 100); virtual classroom education delivery 843; data analytics processing 844; transaction processing 845; and precision cohort analytics 846.

The present invention may be a system, a method, and/or a computer program product at any possible technical detail level of integration. The computer program product may include a computer-readable storage medium (or media)

having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for removing padding oracles from Rivest, Shamir, Adleman (RSA) encryption, the computer-implemented method comprising:
   padding a plaintext message producing a padded plaintext message using a padding scheme that appends random data onto the plaintext message such that the padded plaintext message is a multiple of a block size;
   generating, randomly, an ephemeral key, wherein a memory size of the ephemeral key is a multiple of a memory size of the padded plaintext message;
   generating, randomly, an initialization vector, wherein a memory size of the initialization vector is another multiple of the memory size of the padded plaintext message;
   encrypting the padded plaintext message with the ephemeral key and the initialization vector using a block cipher to produce an encrypted data block of fixed-size;
   calculating a hash value corresponding to the encrypted data block, wherein the hash value provides integrity verification relating to the encrypted data block;
   prepending the hash value, the ephemeral key, and the initialization vector to the encrypted data block; and
   performing RSA encryption on the encrypted data block prepended with the hash value, the ephemeral key, and the initialization vector.

2. The computer-implemented method of claim 1, further comprising:
   receiving a second encrypted data block encrypted using RSA encryption;
   decrypting the second encrypted data block using a textbook RSA decryption technique;
   retrieving prepended information from the second decrypted data block, wherein the prepended information includes a second hash value, a second ephemeral key, and a second initialization vector;
   calculating a verification hash value corresponding to the encrypted data block;
   performing an integrity verification on the encrypted data block by comparing the verification hash value to the second hash value;
   decrypting, upon verification that the verification hash value is equivalent to the second hash value, the encrypted data block using the second ephemeral key and second initialization vector, whereby a second padded plaintext message is revealed; and
   removing padding from the second padded plaintext message, whereby a second plaintext message is revealed.

3. The computer-implemented method of claim 2, further comprising:
   detecting an error based on the integrity verification performed on the second hash value; and
   returning an error message to a sending party.

4. The computer-implemented method of claim 2, further comprising:
   determining whether the second ephemeral key is a key duplicate by comparing the second ephemeral key to entries in a key table; and
   storing, upon determining the second ephemeral key is not duplicated, the second ephemeral key in the key table.

5. The computer-implemented method of claim 2, further comprising:
   determining whether the second initialization vector is a vector duplicate by comparing the second initialization vector with entries in a vector table; and
   storing, upon determining the second initialization vector is not duplicated, the second initialization vector in the vector table.

6. The computer-implemented method of claim 1, wherein the block cipher uses a cipher block chaining mode to encrypt the padded plaintext message.

7. The computer-implemented method of claim 1, wherein the padding performed on the plaintext message uses optimal asymmetric encryption padding (OAEP).

8. A computer program product comprising a computer readable storage medium having program instructions embodied therewith, the program instructions executable by a processor to cause the processor to perform a method comprising:
   padding a plaintext message producing a padded plaintext message using a padding scheme that appends random data onto the plaintext message such that the padded plaintext message is a multiple of a block size;
   generating, randomly, an ephemeral key, wherein a memory size of the ephemeral key is a multiple of a memory size of the padded plaintext message;
   generating, randomly, an initialization vector, wherein a memory size of the initialization vector is another multiple of the memory size of the padded plaintext message;
   encrypting the padded plaintext message with the ephemeral key and the initialization vector using a block cipher to produce an encrypted data block of fixed-size;
   calculating a hash value corresponding to the encrypted data block, wherein the hash value provides integrity verification relating to the encrypted data block;
   prepending the hash value, the ephemeral key, and the initialization vector to the encrypted data block; and
   performing RSA encryption on the encrypted data block prepended with the hash value, the ephemeral key, and the initialization vector.

9. The computer program product of claim 8, further comprising:
   receiving a second encrypted data block encrypted using RSA encryption;
   decrypting the second encrypted data block using a textbook RSA decryption technique;
   retrieving prepended information from the second decrypted data block, wherein the prepended information includes a second hash value, a second ephemeral key, and a second initialization vector;
   calculating a verification hash value corresponding to the encrypted data block;
   performing an integrity verification on the encrypted data block by comparing the verification hash value to the second hash value;
   decrypting, upon verification that the verification hash value is equivalent to the second hash value, the encrypted data block using the second ephemeral key and second initialization vector, whereby a second padded plaintext message is revealed; and
   removing padding from the second padded plaintext message, whereby a second plaintext message is revealed.

10. The computer program product of claim 9, further comprising:
    detecting an error based on the integrity verification performed on the second hash value; and
    returning an error message to a sending party.

11. The computer program product of claim 9, further comprising:
   determining whether the second ephemeral key is a key duplicate by comparing the second ephemeral key to entries in a key table; and
   storing, upon determining the second ephemeral key is not duplicated, the second ephemeral key in the key table.

12. The computer program product of claim 9, further comprising:
   determining whether the second initialization vector is a vector duplicate by comparing the second initialization vector with entries in a vector table; and
   storing, upon determining the second initialization vector is not duplicated, the second initialization vector in the vector table.

13. The computer program product of claim 8, wherein the block cipher uses a cipher block chaining mode to encrypt the padded plaintext message.

14. The computer program product of claim 8, wherein the padding performed on the plaintext message is agnostic.

15. A system for removing padding oracles from RSA encryption, the system comprising:
   a data processing component;
   a physical memory; and
   local data storage having stored thereon computer executable program code, which when executed by the data processing component causes the data processing component to:
   pad a plaintext message producing a padded plaintext message using a padding scheme that appends random data onto the plaintext message such that the padded plaintext message is a multiple of a block size;
   generate, randomly, an ephemeral key, wherein a memory size of the ephemeral key is a multiple of a memory size of the padded plaintext message;
   generate, randomly, an initialization vector, wherein a memory size of the initialization vector is another multiple of the memory size of the padded plaintext message;
   encrypt the padded plaintext message with the ephemeral key and the initialization vector using a block cipher to produce an encrypted data block of fixed-size;
   calculate a hash value corresponding to the encrypted data block, wherein the hash value provides integrity verification relating to the encrypted data block;
   prepend the hash value, the ephemeral key, and the initialization vector to the encrypted data block; and
   perform RSA encryption on the encrypted data block prepended with the hash value, the ephemeral key, and the initialization vector.

16. The system of claim 15, further comprising:
   receive a second encrypted data block encrypted using RSA encryption;
   decrypt the second encrypted data block using a textbook RSA decryption technique;
   retrieve prepended information from the second decrypted data block, wherein the prepended information includes a second hash value, a second ephemeral key, and a second initialization vector;
   calculate a verification hash value corresponding to the encrypted data block;
   perform an integrity verification on the encrypted data block by comparing the verification hash value to the second hash value;
   decrypt, upon verification that the verification hash value is equivalent to the second hash value, the encrypted data block using the second ephemeral key and second initialization vector, whereby a second padded plaintext message is revealed; and
   remove padding from the second padded plaintext message, whereby a second plaintext message is revealed.

17. The system of claim 16, further comprising:
   detect an error based on the integrity verification performed on the second hash value; and
   return an error message to a sending party.

18. The system of claim 16, further comprising:
   determine whether the second ephemeral key is a key duplicate by comparing the second ephemeral key to entries in a key table; and
   store, upon determining the second ephemeral key is not duplicated, the second ephemeral key in the key table.

19. The system of claim 16, further comprising:
   determine whether the second initialization vector is a vector duplicate by comparing the second initialization vector with entries in a vector table; and
   store, upon determining the second initialization vector is not duplicated, the second initialization vector in the vector table.

20. The system of claim 15, wherein the block cipher uses a cipher block chaining mode to encrypt the padded plaintext message.

\* \* \* \* \*